April 23, 1968    J. R. PARKER    3,379,050
INSTRUMENT FOR THE MEASUREMENT OF THE ROUGHNESS OF PAPER
Filed Nov. 26, 1965    3 Sheets-Sheet 1

Inventor:
John Russell Parker
By Baldwin & Wight
Attorneys

April 23, 1968     J. R. PARKER     3,379,050
INSTRUMENT FOR THE MEASUREMENT OF THE ROUGHNESS OF PAPER
Filed Nov. 26, 1965     3 Sheets-Sheet 3

Inventor:
John Russell Parker
By Baldwin & Wight
Attorneys

United States Patent Office 3,379,050
Patented Apr. 23, 1968

3,379,050
INSTRUMENT FOR THE MEASUREMENT OF
THE ROUGHNESS OF PAPER
John Russell Parker, Gravesend, England, assignor to Bowaters United Kingdom Pulp and Paper Mills Limited, London, England, a corporation of the United Kingdom
Filed Nov. 26, 1965, Ser. No. 509,836
Claims priority, application Great Britain, Dec. 1, 1964, 48,762/64
8 Claims. (Cl. 73—37)

ABSTRACT OF THE DISCLOSURE

An instrument for measuring roughness of a surface, such as paper, measures the flow of fluid under pressure across one or more thin metering lands maintained in contact with the surface. The land means is located within a channel within a paper-contacting head. Pressure fluid flows through duct means within the head to the channel and between the land means and the surface being tested for roughness.

---

This invention relates to an instrument for measuring the roughness of paper.

The printability of paper is related to its roughness and therefore by determing the latter, it is possible to assess the former without actually performing a printing operation. Thus quality control of paper, with regard to printability, may be performed at the paper-making plant without reference to the printer.

According to the present invention an instrument for measuring the roughness of paper comprises a head having an operative face against which the paper, the roughness of which is to be determined, is held by a backing member, a channel opening to said face and divided into one or more inlet chambers and one or more outlet chambers by one or more metering lands, and ducting leading from each chamber, whereby, when in use, the inlet chamber(s) may be connected to a source of fluid pressure and the outlet chamber(s) may be connected to a fluid flow meter.

The head and backing member are relatively movable whereby they may be brought together at predetermined controlled pressure. Preferably, the head is fixed to a support frame and the backing member is movably mounted therein. The backing member may be carried by a plate attached to a flexible diaphragm forming one side wall of a fluid-pressure chamber.

The surface of the backing member presented to the operative face of the head may be resiliently deformable to represent the resilient packing of a printing press. Said surface, for example, may be provided by a pad of material the same as that used for a printing press blanket.

The operative surface of the head may be circular in outline and in a central zone may be recessed, whereby said surface comprises two annular lands, herebefore called guard rings, separated by an annular gap divided by a single annular metering land into a single annular inlet chamber and a single annular outlet chamber, all the lands being coplanar.

Alternatively the head may comprise a series of parallel plates plied together with spacers arranged between them. Preferably the spacers are shaped so as to form between each pair of plates a chamber which has an opening on one side of the assembly; the plates and spacers are perforated and arranged so that air under pressure can be supplied to alternate chambers (inlet chambers) and air can be collected by a separate passageway from the remaining chambers (outlet chambers); the plates and spacers are clamped together to form a rigid assembly; and the face of the assembly to which all the chambers open is flat. The paper sample to be tested is pressed against this flat face, and the operator measures the air which flows from the inlet chambers, between the paper surface and the edges of the plates (these edges functioning as metering lands), and thence into the outlet chambers. This arrangement may if desired be modified by the replacement of the parallel plates by coaxial plates in the shape of cylinders or sections of cylinders.

Two embodiments of the present invention are now described with reference to the accompanying drawings in which.

Figure 1:
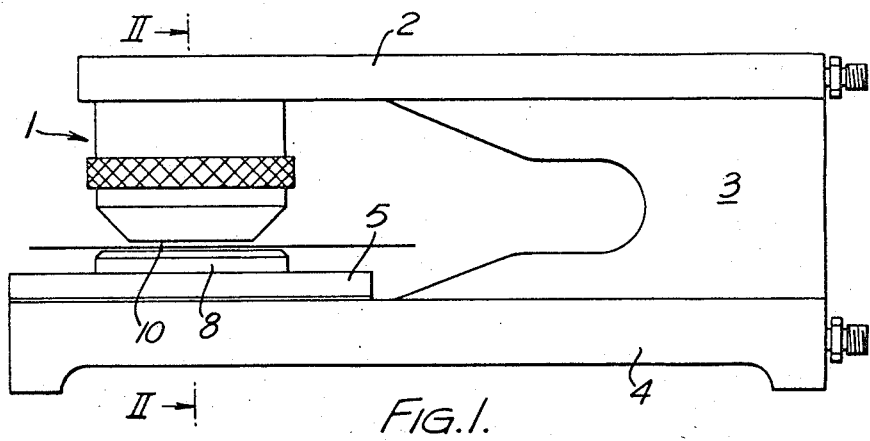
FIGURE 1 shows a side elevation of one form of instrument.
Figure 4:
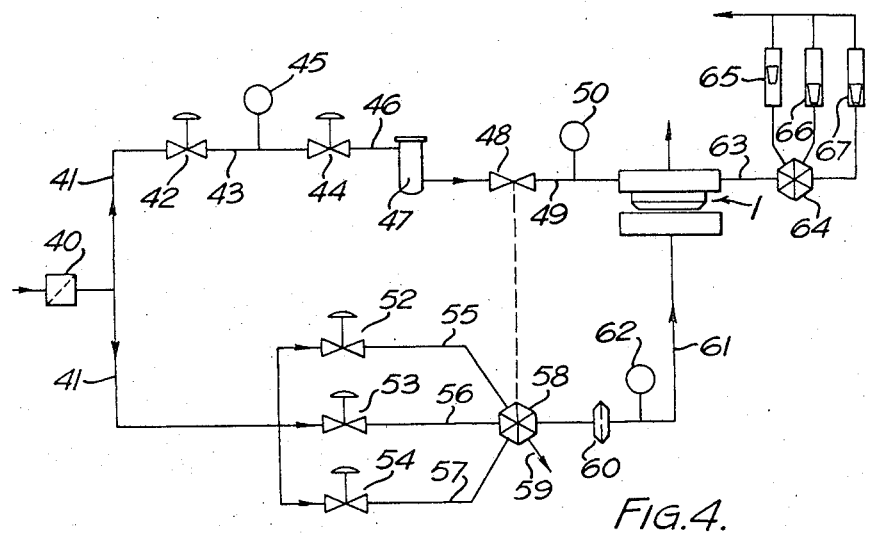
Figure 2:
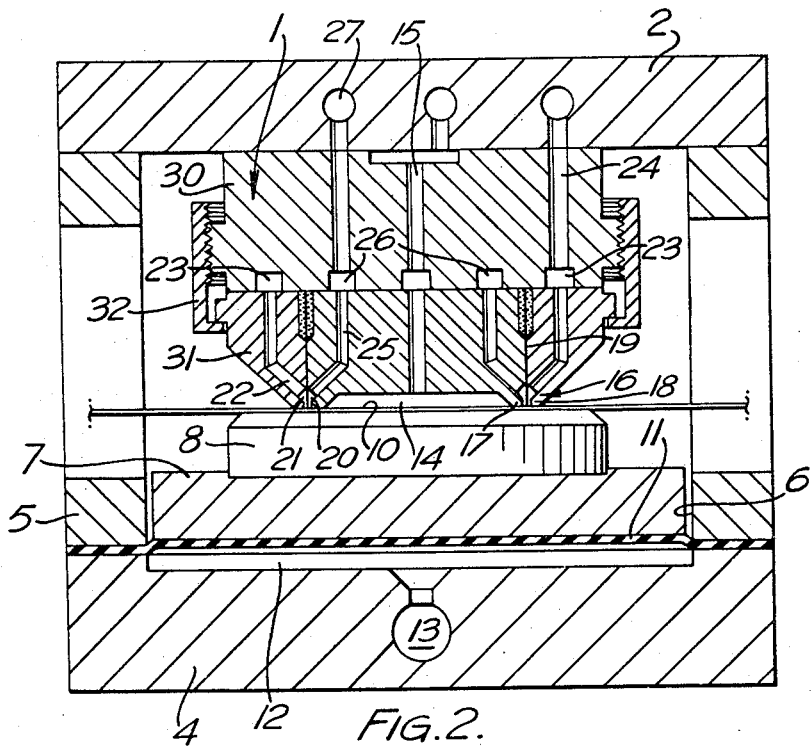
FIGURE 2 is a section on the line II—II of FIGURE 1.
Figure 3:
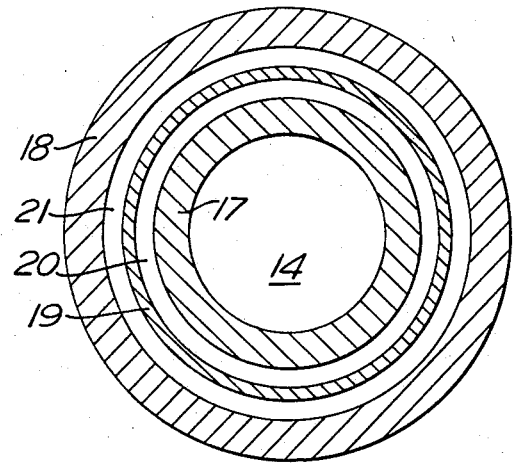
Figure 6:
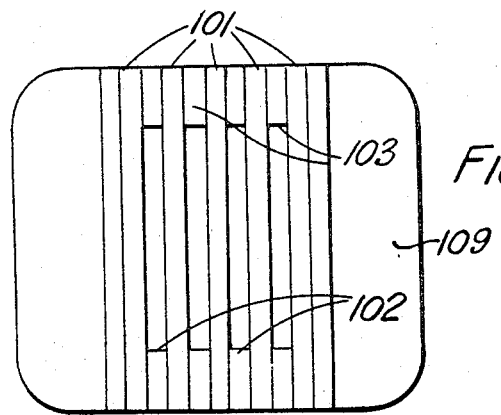
Figure 7:
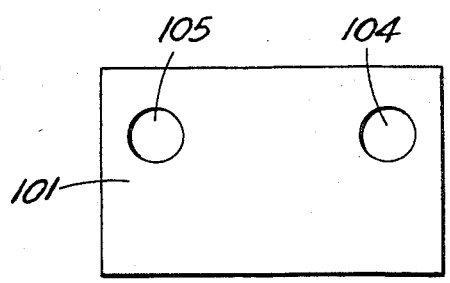

FIGURE 3 is a bottom plan view of the head of the same instrument, hatching lines being shown for distinguishing purposes, FIGURE 4 schematically illustrates the fluid flow circuit of the instrument of FIGS. 1–3, FIGURE 5 is a fractional vertical section of another form of instrument, FIGURE 6 is a bottom plan view of the head of the instrument of FIG. 5, and FIGURES 7, 8 and 9 show certain components of the same instrument.

Referring to FIGS. 1–3, a head 1 of the instrument is carried by a top arm 2 fixed to a support member 3, mounted on a base plate 4. A disc 5 formed with a central aperture 6 is mounted on the top surface of the base plate 4. A movable plate 7 lies within the aperture 6 and mounts on its top surface a backing member 8. The backing member 8 registers with an operative face 10 of the instrument head 1.

As can be seen in FIGURE 1, the instrument head 1 and opposed backing member 8 are located towards corresponding ends of the top arm 2 and bottom plate 4, and support member 3 is at the other ends thereof. Thus a sheet of paper to be tested can be slipped, without interference, between the backing member 8 and head 1.

Referring to FIGURE 2, the plate 7 is attached to a flexible diaphragm 11, for example, a rubber diaphragm, the peripheral edge of which is trapped between the disc 5 and the bottom plate 4. A pressure chamber 12 is defined between the end surface of the diaphragm 11 and the base of the aperture 6. A duct 13 connected to a source of fluid pressure leads into the pressure chamber 12. Thus by changing the fluid pressure prevailing in the chamber 12, the plate 7 may be lifted and lowered, moving the backing member 8 towards and away from the operative face 10 of the instrument head 1.

The operative face 10 of the instrument head 1 is circular in outline, and is formed with a central recess 14 communicating with the atmosphere through passageways 15. An annular channel 16 opens into the operative face 10, the channel 16 being bounded by two annular guard rings 17 and 18. The metering land 19 divides the channel 16 into an annular inlet chamber 20 and an annular outlet chamber 21. The edge of the annular land 19 is coplanar with the annular faces presented by the guard rings 17 and 18.

Circumferentially spaced passageways 22 lead back from the outer annular chamber 21 to an annular gallery chamber 23 from which a duct 24 leads to the exterior of the instrument head 1. Likewise, circumferentially spaced passageways 25 lead back from the inner annular chamber 20 to an annular gallery chamber 26 communicating with a duct 27 leading to the exterior of the instrument head 1.

For convenience of assembly, the head is made in two portions 30 and 31; the top portion 30 is fixed on to the top arm 2, and the bottom portion 31 is releasably secured to the top portion 30 by a screwed locking ring 32.

Thus by releasing the ring 32 the bottom portion 31 may be removed for maintenance and cleaning and may be replaced by a different portion having an operative face of different dimensions. The top portion 30 and the bottom portion(s) 31 have their mating faces ground flat so that when these faces are greased an airtight joint is formed.

The backing member 8 is made of resiliently deformable material to represent and reproduce the packing of a printing press. The backing 8 may be a pad of resilient material, the same as that used for a printing press, for example, a composite sheet material comprising various layers plied together, at least one of the layers being of a resilient substance; some specific examples are rubber with fabric reinforcement, with or without a manila facing, rubberised cork, Melinex (polyester film) faced cork and rubber with an anti-set-off coating of minute glass spheres.

If the instrument is to be used for testing paper for use in a particular press, then the backing member 8 should preferably be of the same material as the press blanket. If a standardised measurement of roughness is to be made with the instrument, then the backing member may be of a natural or synthetic rubber composition of standardised hardness, bonded to a metal plate and ground to a standard thickness. For example, a sheet of neoprene ground to a thickness of 0.040 inch with its hardness adjusted to 85° Shore (A scale) would be an appropriate backing for newsprint. For coated letterpress papers, a 0.035 inch layer of rubberised cork faced with a 0.005 inch sheet of Melinex polyester film and bonded to a metal plate could be used as a standard backing.

It has been found that the width of the metering land 19 should be chosen according to the type of paper, the roughness of which is being determined.

It has also been found that the width of the metering land 19 should be made as narrow as is reasonably possible. A width of 0.0020 inch has been found to be a satisfactory compromise permitting heads to be constructed without undue difficulty. The widths of the annular gaps on either side of the metering land, i.e., the gaps between the metering land and the guard rings 17 and 18, are important because if they are too large then the results obtained will be affected by permeability errors, i.e., flow of air through the paper additional to that flowing through the gap or gaps between the metering land and the paper. However, experiments have shown that minor variations in the width of the gap do not seriously affect the results. For purposes of standardisation, it is convenient to make each gap 0.002 inch wide.

Referring to FIGURE 4 an instrument according to the present invention is indicated at I and is connected into an air pressure flow circuit to which air under pressure is fed through an air filter 40. Air passes through a flow line 41 from the air filter 40 at a pressure in the range 50–100 lbs. per square inch through a pressure reducing valve 42 and then through a line 43 at a pressure of 15 lbs. per square inch to a second pressure reducing valve 44. A pressure gauge 45 is connected into the line 43. From the pressure reducing valve 44 air at an appropriate pressure, which may be for example 2 lbs. per square inch for newsprints, or 5 lbs. per square inch for coated papers, is passed through a line 46 to a humidifier 47 and then to an on/off control valve 48 from whence it passes over a line 49 to the instrument head being connected to the duct 27 thereof. Conveniently, a pressure gauge 50 is connected to the line 49. Also leading from the air filter 40 is a line 41 branching to three pressure reducing valves 52, 53, 54 connected by lines 55, 56 and 57 to a selector valve 58. The pressures in these three lines respectively (assuming the instrument is to be used for newsprint) are 10 lbs. per square inch, 20 lbs. per square inch, 40 lbs. per square inch, and when these pressures are applied to the flexible diaphragm 11 the paper is pressed against the operative face 10 of the head 1 at pressures of 142, 284 and 568 lbs. per square inch respectively, i.e., 10, 20 and 40 kg./cm.$^2$ respectively. The selector valve 58 is vented to atmosphere 59. A flow restrictor 60 is connected to a line 61 leading from the selector valve 58 to the duct 13 of the instrument. Conveniently, the pressure gauge 62 is connected into this line 61.

The duct 24 of the instrument is connected by a line 63 to a selector valve 64 having three outputs each connected to a flowmeter 65, 66 and 67. The flowmeters may be of any suitable type and it has been found that those known as rotameters are particularly suitable. Three flow meters are provided because it is necessary to cater for a wide range of flows and according to the rate of flow so the appropriate meter can be selected by the valve 64.

The principle of the instrument according to the present invention is based on the fact that the rate of leakage or flow of air through the gap or gaps between the surface of a sheet of paper and the metering land 19 when pressed thereagainst, is related to the roughness of the paper surface. By the formula $G = kq^{1/3}$ the mean gap $G$ between the paper and measuring land may be found from the air flow $q$, measured at pressure $p$, and the constant $k$, which is calculated from the dimensions of the metering land, the air viscosity $\mu$, the mean air pressure $\bar{p}$, the measuring pressure $p$, and the differential air pressure $\Delta p$ across the metering land. The formula for $k$ is $k = [(12\ \mu t p)/(L\bar{p}\Delta p)]^{1/3}$ where $L$ and $t$ are respectively the effective length and width of the metering land.

With the instrument connected into an air pressure circuit, as described above, with reference to FIGURE 4, the roughness of sample test pieces of paper may be quickly and readily determined by placing a test piece between the head 1 and the backing member 8, applying air pressure by selection of the valve 58 to the chamber 12 so that the backing member 8 is lifted to press the paper against the operative surface 10 of the head 1 and opening the valve 48. If the flow meters 65, 66 and 67 are provided with scales which directly indicate the mean gap G, a direct reading is obtained. It will be appreciated that the appropriate flow meter is selected according to the rate of flow of air from the annular chamber 20 under the metering land 19 into the annular chamber 21. Thus, if the flow meter first selected by the valve 64 is inappropriate for the rate of flow, then an alternative flow meter is selected appropriate to the rate of flow. The three alternative sources of air pressure mentioned earlier for application in the pressure chamber 12 are provided so that the appropriate one may be selected to simulate the pressure of a printing press nip.

The instrument described above has the particular advantages (1) that the pressure applied to the paper during testing can if desired be varied inside the range 50 to 1000 lbs. per square inch to correspond with pressure actually used in printing; (2) that the paper can be backed during testing with any of the resilient sheet materials normally used as press blankets; and (3) that errors due to air passing through the thickness of the paper are reduced by guard rings (17 and 18 in the accompanying drawings) provided one within and one outside the metering land (19 in the drawings).

In the instrument shown in FIGS. 5–9, the head comprises a series of parallel plates plied together with spacers between them. The parallel plates are all in the form of plain rectangles with two perforations, as shown at 101 in FIGS. 5 and 7, but the spacers (though identical and interchangeable with each other) are arranged to afford inlet chambers as shown at 102 in FIGS. 5 and 8 and outlet chambers as shown at 103 in FIGS. 5 and 9, the inlet and outlet ducting being afforded by the perforations indicated in FIGS. 7–9 at 104 and 105 respectively, and by the passageways indicated at 106 and 107 respectively in FIG. 6.

Figure 5:
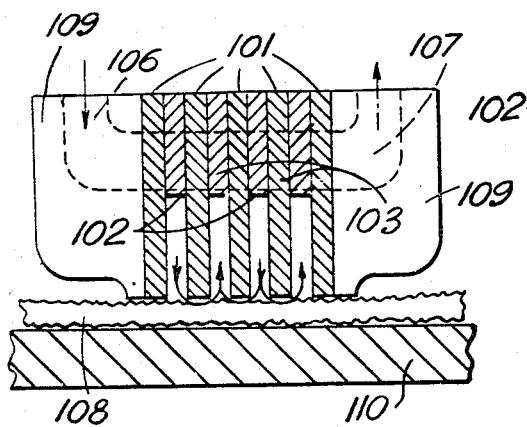
Figure 8:
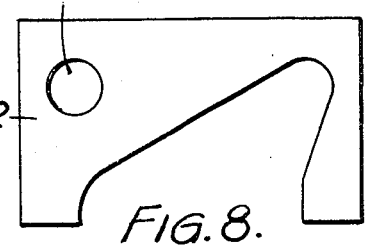
Figure 9:
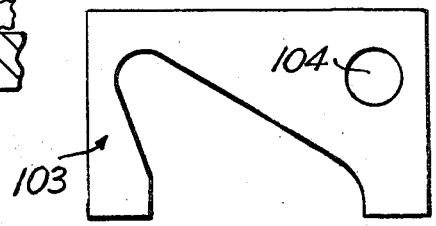

As will be seen from FIG. 5, the instrument of FIGS. 5–9 can be used in a similar manner to that of FIGS. 1–3, the paper to be tested (108) being confined between the head 109 and the backing member 110 as before. The fluid flow arrangements may be as described above with reference to FIG. 4. The plates 101, the spacers 102 and 103, and the two ends of the head 109 may be clamped together by any convenient means.

I claim:

1. A paper roughness gauge comprising a paper-contacting head, a backing member opposing the paper-contacting head, a channel within said head and opening to the paper-contacting face of the paper-contacting head and being divided into at least one inlet chamber within said head and at least one outlet chamber within said head by at least one metering land within said head, and ducting within said head leading from each chamber and permitting the connection of the inlet and outlet chambers to a source of fluid pressure and a fluid flow meter respectively.

2. A gauge as claimed in claim 1, in which the paper-contacting head is fixed to a support frame and the backing member is movably mounted therein.

3. A gauge as claimed in claim 2, in which the backing member is carried by a plate attached to a flexible diaphragm forming one side wall of a fluid-pressure chamber.

4. A gauge as claimed in claim 1, in which the surface of the backing member presented to the operative face of the paper-contacting head is resiliently deformable.

5. A gauge as claimed in claim 1, in which the operative surface of the paper-contacting head is circular in outline, is recessed in a central zone, and presents two annular lands separated by an annular gap divided by a single annular metering land into a single annular inlet chamber and a single outlet chamber, all the lands being coplanar.

6. A gauge as claimed in claim 1, in which the paper-contacting head comprises a series of parallel plates plied together with spacers between them.

7. A gauge as claimed in claim 6, in which the spacers between each pair of plates afford a chamber which has an opening on one side of the assembly; the plates and spacers have registering air-supply perforations serving alternate chambers and registering air-collection perforations serving the remaining chambers; the plates and spacers are rigidly clamped together; and the face of the assembly to which all the chambers open is flat.

8. A gauge as claimed in claim 1, in which the paper-contacting head comprises a series of coaxial plates of which the shape is that of at least a section of a cylinder, the plates being plied together with spacers between them.

References Cited

UNITED STATES PATENTS 2,618,965  11/1952  Gray _____ 73—37

LOUIS R. PRINCE, *Primary Examiner.*

WILLIAM HENRY II, *Assistant Examiner.*